United States Patent
Al et al.

(10) Patent No.: US 8,873,537 B2
(45) Date of Patent: Oct. 28, 2014

(54) SYNCHRONIZATION METHOD AND SYSTEM OF CONTROL SEQUENCE NUMBERS

(75) Inventors: Jianxun Al, Guangdong (CN); Cuifeng Yao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 748 days.

(21) Appl. No.: 13/260,122

(22) PCT Filed: Apr. 28, 2009

(86) PCT No.: PCT/CN2009/071530
§ 371 (c)(1),
(2), (4) Date: Sep. 23, 2011

(87) PCT Pub. No.: WO2010/017713
PCT Pub. Date: Feb. 18, 2010

(65) Prior Publication Data
US 2012/0106538 A1    May 3, 2012

(30) Foreign Application Priority Data
Aug. 13, 2008   (CN) .......................... 2008 1 0135162

(51) Int. Cl.
| | |
|---|---|
| H04J 3/06 | (2006.01) |
| H04L 12/56 | (2006.01) |
| H04W 4/00 | (2009.01) |
| H04L 12/801 | (2013.01) |
| H04W 56/00 | (2009.01) |

(52) U.S. Cl.
CPC .............. *H04W 56/00* (2013.01); *H04L 47/34* (2013.01); *H04W 56/0075* (2013.01); *H04W 56/001* (2013.01)

USPC .......... 370/350; 370/503; 370/394; 370/328; 370/312; 455/450

(58) Field of Classification Search
USPC ......... 370/328, 329–330, 338, 346, 350, 392, 370/394, 469, 470, 473, 474, 509
See application file for complete search history.

(56) References Cited

U.S. PATENT DOCUMENTS

| | | | |
|---|---|---|---|
| 7,116,667 B2 * | 10/2006 | Jiang et al. ..................... | 370/394 |
| 7,266,105 B2 * | 9/2007 | Wu ............................... | 370/338 |
| 7,388,883 B2 * | 6/2008 | Jiang ............................. | 370/470 |
| 7,756,135 B2 * | 7/2010 | Yi et al. ........................ | 370/394 |

(Continued)

FOREIGN PATENT DOCUMENTS

| | | |
|---|---|---|
| CN | 101039175 A | 9/2007 |
| CN | 101047437 A | 10/2007 |

(Continued)

*Primary Examiner* — Candal Elpenord
(74) *Attorney, Agent, or Firm* — Christopher L. Parmelee; Walker & Jocke

(57) ABSTRACT

A synchronization method and system of control sequence numbers is provide to achieve radio link control sequence number synchronization between different network elements. This method includes the following steps: allocating a preset radio link control sequence number to a first radio link control protocol data unit corresponding to a first packet in a data burst and successively allocating a radio link control sequence number to subsequent radio link control protocol data units corresponding to packets of this data burst, when each designated network element in a plurality of designated network elements performing radio link control protocol process on the packets in the data burst received by said each designated network element.

19 Claims, 4 Drawing Sheets

(56) References Cited

U.S. PATENT DOCUMENTS

| | | | |
|---|---|---|---|
| 8,005,085 B2* | 8/2011 | Bakker et al. | 370/390 |
| 8,081,619 B2* | 12/2011 | Jiang | 370/350 |
| 8,228,917 B2* | 7/2012 | Vayanos et al. | 370/394 |
| 8,295,265 B2* | 10/2012 | Wu | 370/349 |
| 8,437,306 B2* | 5/2013 | Attar et al. | 370/331 |
| 2003/0147370 A1* | 8/2003 | Wu | 370/338 |
| 2003/0165161 A1* | 9/2003 | Kalliokulju et al. | 370/466 |
| 2003/0235212 A1* | 12/2003 | Kuo | 370/503 |
| 2008/0273537 A1* | 11/2008 | Meylan et al. | 370/394 |
| 2009/0028126 A1* | 1/2009 | Meylan | 370/346 |
| 2009/0168751 A1* | 7/2009 | Sharma et al. | 370/350 |

FOREIGN PATENT DOCUMENTS

| | | |
|---|---|---|
| CN | 101047492 A | 10/2007 |
| CN | 101051864 A | 10/2007 |
| CN | 101222484 A | 7/2008 |

* cited by examiner

SYNCHRONIZATION METHOD AND SYSTEM OF CONTROL SEQUENCE NUMBERS

FIELD OF THE INVENTION

The present invention relates to communication field, and in particular to a synchronization method and system of control sequence numbers.

BACKGROUND OF THE INVENTION

With the development of the Internet, a large amount of multimedia services emerge, and the requirements of people on mobile communication are no longer limited to the telephone and message services. At present, the application service is introduced into the multimedia service, and the feature of the application service is that a plurality of subscribers can receive the same data simultaneously, such as video on demand, TV broadcast, video conference, online education, interactive games, etc.

In order to effectively use the resources of the mobile network, the multimedia broadcast multicast service (MBMS) technology is proposed, and the MBMS is a point-to-multipoint service in which a data source sends data to a plurality of subscribers. Through this service, the share of network resources can be achieved, wherein this share includes the resource share of the mobile core network and the access network, and in particular the share of air interface resources. And the MBMS in 3GPP can not only achieve the multicast and broadcast of pure text messages with low rate but also can achieve the multicast and broadcast of multimedia services with high rate.

The MBMS single frequency network transmission (MBSFN) manner is a technology which can improve the spectrum utilization rate of the MBMS service. In the MBSFN, the adjacent cells send the same radio signals synchronously, and the User Equipment (UE) can regard the signals from different base stations as a multi-path signal. A plurality of cells, which send MBMS service radio signals synchronously, constitute MBSFN synchronization area. The cells in the MBSFN synchronization area, which send the same MBMS service signals synchronously, are referred to as MBSFN cells.

Since the MBMS service is the service oriented to the whole network, the same MBMS service may be established on different nodes in the lower-layer network element. In particular, the upper-layer network element sends data stream to the lower-layer network element, wherein this data stream includes a plurality of data bursts and each data burst includes a plurality of data packets. Currently, the MBMS service synchronization of a plurality of network elements among cells is realized through using the following method. FIG. 1 is a block diagram of the logical structure of the upper-layer network element and the lower-layer network element. It can be seen that one upper-layer network element is connected to a plurality of lower-layer network elements to interact signaling. FIG. 2 is a flowchart of a method for realizing the MBMS synchronization according to the prior art. As shown in FIG. 2, it includes the following processing:

Step 202: the upper-layer network element sends MBMS service data packet(s) to each lower-layer network element, wherein this data packet carries timestamp information, data packet sequence number information, accumulated data packet length information, etc. As to one or more successive data packets which need to perform concatenation process of the Radio Link Control (RLC) protocol layer, the upper-layer network element marks (indentifies) the same timestamp information for the one or more data packets, and the one or more data packets which are identified with the same timestamp constitute a data burst, in which one data burst can be a set of successive packets and can also be a single packet;

Step 204: as to each lower-layer network element, it receives the above mentioned MBMS service data packet, wherein RLC protocol layer concatenation process is performed on the data packets in the same data burst and the RLC concatenation is not performed on the packets in different data bursts;

Step 206: the lower-layer network element starts to process the packets in the same data burst according to their sequence numbers at the moment indicated by the identified timestamp;

Step 208: the lower-layer network element detects whether there is packet(s) lost and the number of the lost packets according to the data packet sequence number information in each data packet; and Step 210: the lower-layer network element detects the accumulated length of the lost data packet according to the accumulated data packet length information carried by each data packet, and constructs a virtual data packet.

The MBMS service packets sent to each lower-layer network element by the upper-layer network element are completely identical, so each lower-layer network element can perform totally consistent process to achieve the synchronous sending of the MBMS service among cells of individual lower-layer network elements.

By virtue of the above method, when detecting packet(s) being lost, the lower-layer network element can construct virtue data packet(s) according to the number and total length of the lost packet(s), wherein the number and total length of these virtual packets are consistent with the number and total length of the lost packets. After the construction of virtual packets, the lower-layer network element adds the constructed virtual packet(s) into the user plane protocol process, as if the lost packets were not lost. However, the lower-layer network element does not send user plane data blocks (RLC PDU or MAC PDU) which contain virtual data packets, to ensure that the process on the subsequent packets is the same as other lower-layer network elements and avoid the radio interference with the adjacent cells caused by the inconsistency between the virtual packets and real packets.

It needs to note that the above one upper-layer network element and one or more lower-layer network elements can be the same network element in terms of physical function, and can also be different network elements. The classifications of the upper-layer network element and the lower-layer network element are divided logically to cooperate to complete the function of service synchronization. That is, a plurality of same or different physical network elements are divided into an upper-layer network element and one or more lower-layer network elements according to the logical function. These network elements cooperate to achieve sending MBMS service by way of combining a plurality of cells in the lower-layer network element cells.

In the above synchronization method of MBMS service among cells of the plurality of network elements, each lower-layer network element cell independently completes the radio link control protocol (RLC) process on the MBMS service data packets, which in particular includes: allocating a RLC sequence number, RLC segmentation and concatenation. In normal situation, each lower-layer network element maintains the current RLC sequence number and performs the above RLC process according to the currently received packets. Since the initial RLC sequence number of each lower-layer network element can be kept synchronous by configuration, each lower-layer network element can maintain the consistency of RLC sequence number allocation during the process of data processing.

However, in the existing synchronization method of MBMS service among cells of a plurality of network elements, there is the problem that is: after one certain lower-layer network element restarts due to management reason or abnormal situation, this lower-layer network element is unable to determine a correct radio link control protocol sequence number, which causes it is incapable of maintaining RLC sequence number synchronization with other lower-layer network elements which do not restart.

SUMMARY OF THE INVENTION

The present invention is proposed considering the problem in related art that the lower-layer network element, after restarting, is unable to determine a correct radio link control protocol sequence number and unable to maintain RLC sequence number synchronization with other lower-layer network elements which do not restart. Therefore, the main aspect of the present invention is to provide an improved solution for achieving the synchronization of control sequence numbers so as to solve at least one of the above problems.

For the above object, a synchronization method of control sequence numbers is provided according to one aspect of the present invention, the method is used for achieving the synchronization of radio link control sequence numbers between different network elements.

The synchronization method of control sequence numbers according to the present invention comprises: allocating a preset radio link control sequence number to a first radio link control protocol data unit corresponding to a first packet in a data burst and allocating a radio link control sequence number to a subsequent radio link control protocol data unit corresponding to packets of this data burst, when each designated network element in a plurality of designated network elements performing radio link control protocol process on the packets in the data burst received by said each designated network element.

For the above object, a synchronization system of control sequence numbers is provided according to another aspect of the present invention, which system is used for achieving the synchronization of radio link control sequence numbers between different network elements.

The synchronization system of control sequence numbers according to the present invention comprises: a processing module, located in each designated network element of a plurality of designated network elements, configured to allocate a preset radio link control sequence number to a first radio link control protocol data unit corresponding to a first packet in a data burst and allocate a radio link control sequence number to subsequent radio link control protocol data unit corresponding to packets of this data burst, when said each designated network element in a plurality of designated network elements performing radio link control protocol process to the packets in the data burst received by said each designated network element.

By virtue of the above at least one technical solution of the present invention, after a lower-layer network element restarts, a predetermine RLC sequence number, allocated to the first protocol data unit generated by the first data packet in each data burst, is capable of maintaining RLC sequence number synchronization with other lower-layer network elements which do not restart, which avoids radio interference of adjacent cells.

BRIEF DESCRIPTION OF THE DRAWINGS

The drawings illustrated here provide a further understanding of the present invention and form a part of the specification, which are used to explain the present invention together with the embodiments of the present invention without unduly limiting the scope of the present invention. In the drawings.

DETAILED DESCRIPTION OF EMBODIMENTS

Since the lower-layer network element is possible to restart, the lower-layer network element is unable to keep consistent with the sequence number allocated after other lower-layer cells perform RLC concatenation and segmentation process on a service packet after the lower-layer network element restarts in the situation that the RLC sequence number maintained by this MBMS service is lost. The embodiments solves this problem by allocating a preset RLC sequence number to the first protocol data unit generated by the first packet in each data burst. The present invention will be described in detail in conjunction with the drawings hereinafter. It needs to note that the embodiments of the present application and the features in the embodiments can be combined with each other if there is no conflict.

Method Embodiments

A synchronization method of control sequence numbers is provided according to the embodiments of the present invention.

Figure 1:
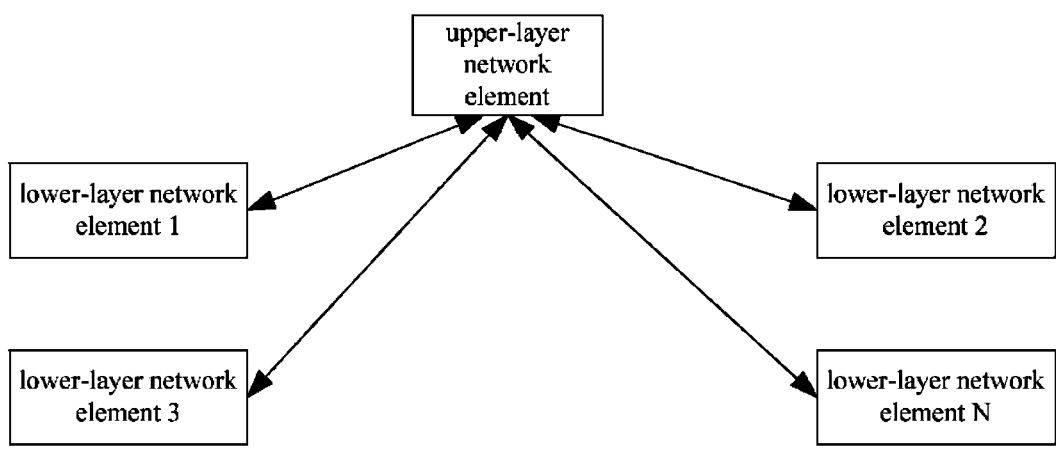
FIG. 1 is a block diagram of the logical structure of an upper-layer network element and a lower-layer network element according to relevant art.
Figure 2:
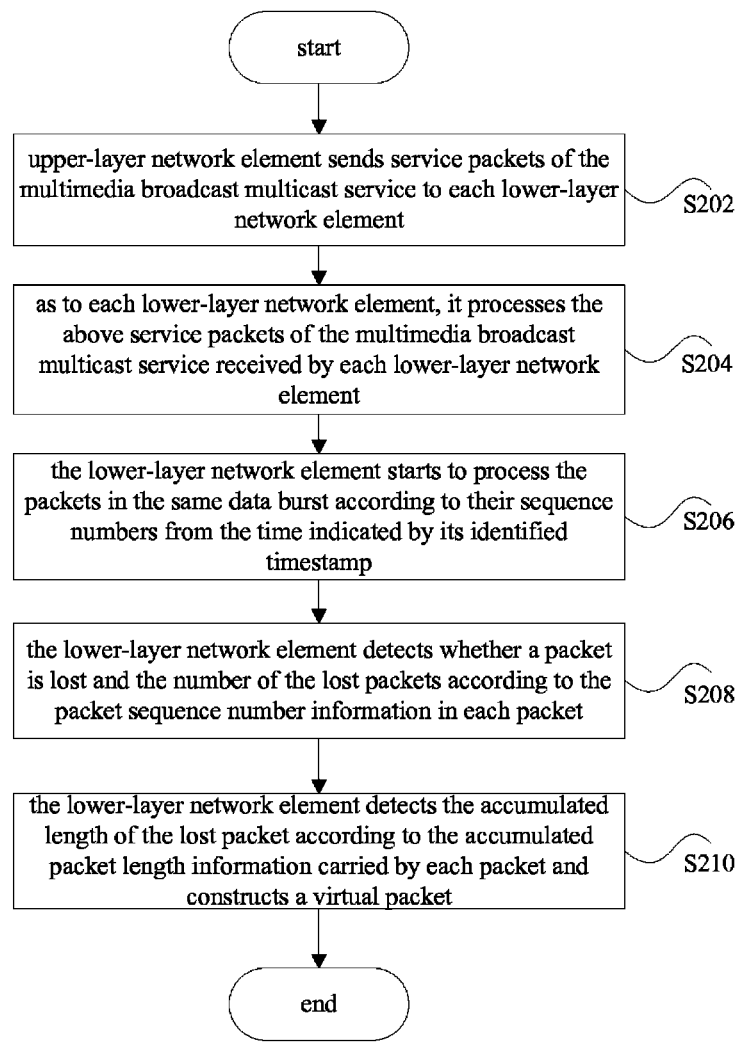
FIG. 2 is a flowchart of a synchronization method of MBMS according to related art.
Figure 3:
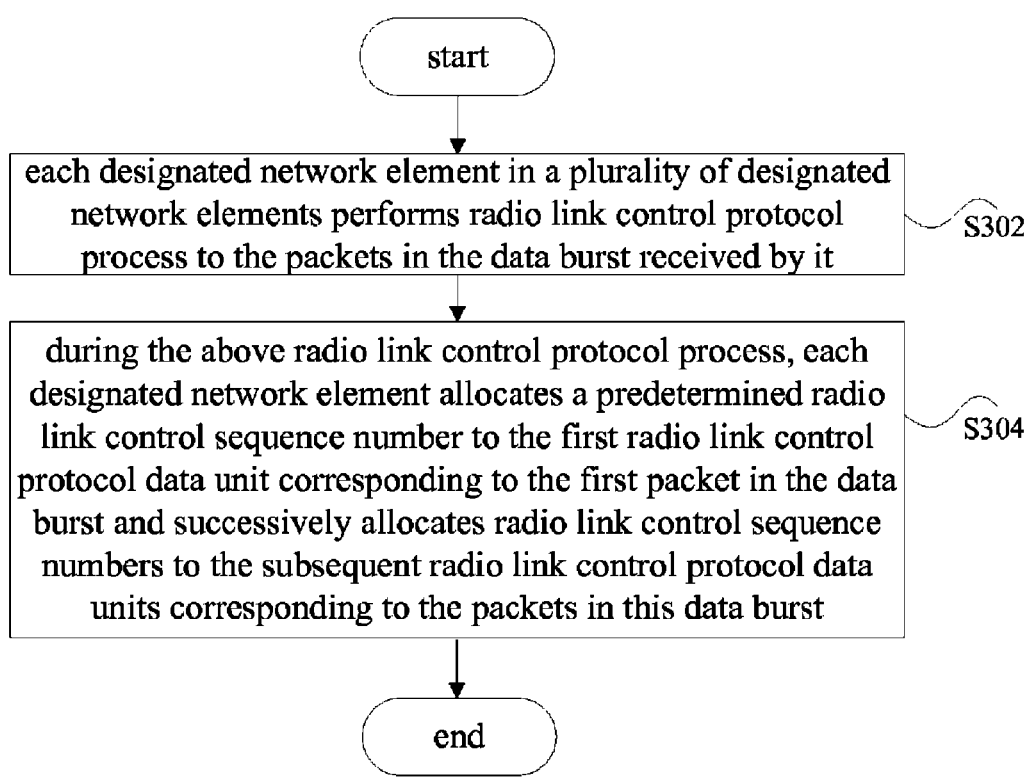
FIG. 3 is a flowchart of a synchronization method of control sequence numbers according to the method embodiments of the present invention.

FIG. 3 is a flowchart of a synchronization method of control sequence numbers according to the method embodiments of the present invention, which method is used for achieving the synchronization of radio link control (RLC) sequence numbers between different network elements. As shown in FIG. 3, this method comprises the following steps:

Step S302: each designated network element in a plurality of designated network elements performs radio link control protocol process on the packets in a data burst received by it; and Step S304: when performing the above radio link control protocol process, each designated network element allocates a preset radio link control sequence number to the first radio link control protocol data unit corresponding to the first packet in the data burst and successively allocates radio link control sequence numbers to the subsequent radio link control protocol data units corresponding to the packets in this data burst, wherein the allocated radio link control sequence number is added by 1 successively.

By virtue of the technical solution provided by the embodiments of the present invention, after a lower-layer network element restarts, a predetermine RLC sequence number allocated to the first protocol data unit generated by the first packet in each data burst is capable of maintaining RLC sequence number synchronization with other lower-layer network elements which do not restart.

In the above, the upper-layer network element and the lower-layer network elements can be in the combination manner of the following network elements (but not limited thereto):

Combination I: during the networking of the MBMS service synchronization of universal terrestrial radio access network (UTRAN) system, the upper-layer network element is an upper-layer radio network controller (abbreviated as RNC) and the lower-layer network element is a lower-layer RNC, wherein the interface between the upper-layer network element and the lower-layer network element is Iur interface, and in this combination, the upper-layer network element and lower-layer network element are network elements with the same physical functions.

Combination II: during the networking of MBMS service synchronization of the enhanced high speed packet access system (HSPA+), the upper-layer network element is main control radio network controller (RNC) or master NodeB+ (i.e. master NB+) and the lower-layer network element is slave NodeB+ (i.e. slave NB+), wherein the interface between the upper-layer network element and lower-layer network element is Iur interface, and in this combination, the upper-layer network element and lower-layer network element are network elements with the same physical functions but different logical functions.

Combination III: during the networking of MBMS service synchronization of the long term evolution (abbreviated as LTE) system, the upper-layer network element is multimedia broadcast multicast service gateway (MBMS Gateway, abbreviated as MGW) or multi-cell/multicast coordination entity (abbreviated as MCE) and the lower-layer network element is evolution node B (E-UTRAN Node B), wherein the interface between the upper-layer network element and lower-layer network element is M2 or M1 interface.

The embodiments of the present invention are applied when a plurality of lower-layer network elements receive the data bursts sent by an upper-layer network element. As to each data burst, when each lower-layer network element performs RLC layer protocol process on the packets which belong to the same data burst, a preset RLC sequence number is allocated to the first RLC PDU generated by the first packet in this data burst. That is, after RLC layer protocol process is performed on a set of service packets which belong to the same data burst, the sequence number of the generated RLC PDU is allocated from one certain value, which can ensure the RLC sequence number to maintain synchronization between a plurality of lower-layer network elements.

As to the preset RLC sequence number, it can be set by the following manners:

Manner I: the protocol defines a determined value, and each lower-layer network element starts to allocate RLC sequence numbers to the packets in each data burst according to the value defined by the protocol.

Manner II: the same preset RLC sequence number is allocated to each lower-layer network element by the signaling process between the upper-layer network element and lower-layer network element. In particular, the upper-layer network element sends a signaling to each lower-layer network element, designates one certain MBMS service or all the MBMS services to configure one certain determined value, to ensure each lower-layer network element to configure the same determined value, and starts to allocate a preset RLC sequence number to the protocol data unit generated by the first packet in each data burst.

Furthermore, as to the above method, the lower-layer network element needs to identify the first packet in each data burst. In particular, the upper-layer network element can set identification information for the first packet in each data burst by the following two manners:

Manner I: the upper-layer network element sets a packet sequence number for the packets in the data burst respectively, takes the packet sequence number corresponding to the first packet in the data burst as the identification information and sets it as a fixed value, and the packet sequence numbers corresponding to other packets in the data burst increases successively from the fixed value according to the sending order. For example, the upper-layer network element sets the packet sequence number corresponding to the first packet in each data burst to be 0, and the lower-layer network element determines that this packet is the first packet of the data burst by detecting the packet sequence number (when detecting that the packet sequence number is 0).

Manner II: the upper-layer network element sets a data burst starting identifier for the first packet in the data burst, wherein the data burst starting identifier is the identification information. The first packet in each data burst carries the data burst starting identifier, which indicates that this packet is the first packet of one certain data burst, and the packet (which is not the first packet) of the data burst does not carry this data burst starting identifier. The lower-layer network element judges whether the packet belongs to the first packet of one certain data burst by detecting this special data burst starting identifier.

The embodiments of the present invention will be described in detail hereinafter.

Figure 4:
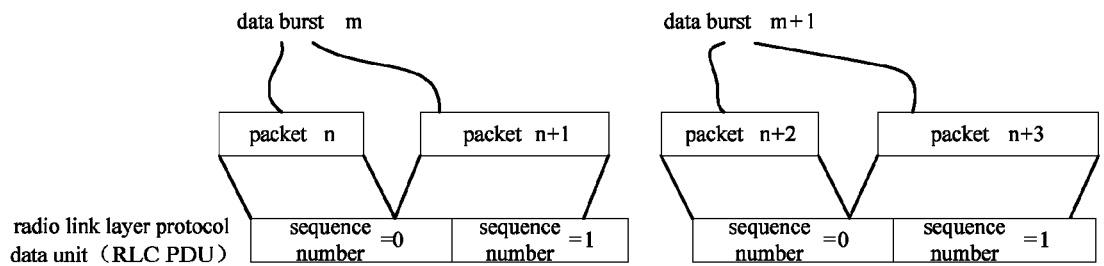
FIG. 4 is a schematic diagram of allocating a RLC protocol sequence number according to the method embodiments of the present invention.

FIG. 4 is a schematic diagram of allocating a RLC protocol sequence number, and as shown in FIG. 4, packet n and packet (n+1) belong to data burst m, and packet (n+2) and (n+3) belong to data burst (m+1).

It is assumed that the RLC sequence number preset by each lower-layer network element is 0, that is, the RLC sequence number corresponding to the first PDU generated by the first packet in each data burst is 0.

When the lower-layer network element performs RLC layer protocol process on the received service packets, it performs RLC segmentation and concatenation process on service packets n and (n+1) which belong to data burst m and the outputted RLC PDU sequence number is allocated starting from fixed value 0. That is, the RLC sequence number of the first RLC PDU generated by data burst m is 0. If n is the first service packet in data burst m, then the RLC sequence number allocated to the first PDU generated by n is 0, the RLC sequence number allocated to the second PDU generated by this data burst m is 1, . . . . Accordingly, the RLC sequence number allocated to the $p^{th}$ PDU generated by this data burst m is p.

When the lower-layer network element performs RLC layer protocol process on the received service packets, it performs RLC segmentation and concatenation process on service packets n and (n+1) which belong to data burst m and the outputted RLC PDU sequence number is allocated starting from the fixed value 0. That is, the RLC sequence number corresponding to the first RLC PDU generated by data burst m is 0. If n is the first service packet in data burst m, then the RLC sequence number allocated to the first PDU generated by n is 0, the RLC sequence number allocated to the second PDU generated by this data burst m is 1, . . . , which is increased successively.

As to data burst (m+1), the lower-layer network element employs the same method as that of data burst m, that is, when the RLC segmentation and concatenation process is performed on the service packets (n+2) and (n+3) of data burst (m+1), the outputted RLC PDU sequence number is still allocated starting from the fixed value 0, that is, the RLC sequence number corresponding to the first RLC PDU generated by data burst (m+1) is 0, with the value of the RLC sequence number which was allocated to the data burst m before not taken in account. If (n+2) is the first service packet in data burst (m+1), then the RLC sequence number allocated to the first PDU generated by (n+2) is 0, the RLC sequence number allocated to the second PDU generated by this data burst (m+1) is 1, . . . , which is increased successively.

As to other data bursts, the same method as that of the above data burst m and data burst (m+1) is employed, that is, as to each data burst, the RLC sequence number corresponding to the first PDU generated by the first packet thereof is set to be 0.

Thus, by virtue of the above method, after the lower-layer network element restarts, after having received the first packet of one certain data burst, this lower-layer network element can process this data burst according to the method provided by the embodiments of the present invention, and allocates a preset RLC sequence number to the first PDU generated by the first packet in this data burst, so as to maintain RLC sequence number synchronization with other lower-layer network elements. As to those lower-layer network elements which do not restart, the same process is performed on the same received data bursts, allocating preset RLC sequence numbers, which can ensure the synchronization between the data process of the lower-layer network element after restarting and those lower-layer network elements which do not restart.

For example, as shown in FIG. 4, after restarting, the lower-layer network element receives packet (n+1) of data burst m. If the lower-layer network element detects that this packet is not the first packet of data burst m, then the lower-layer network element chooses not to send packet (n+1). When receiving packets (n+2) and (n+3), if the lower-layer network element detects that packet (n+2) is the first packet of data burst (m+1), then the lower-layer network element begins to perform the above process on packets (n+2) and (n+3). That is, a preset RLC sequence number is allocated to the first PDU generated by packet (n+2), and this RLC sequence number is a fixed value.

System Embodiments

Figure 5:
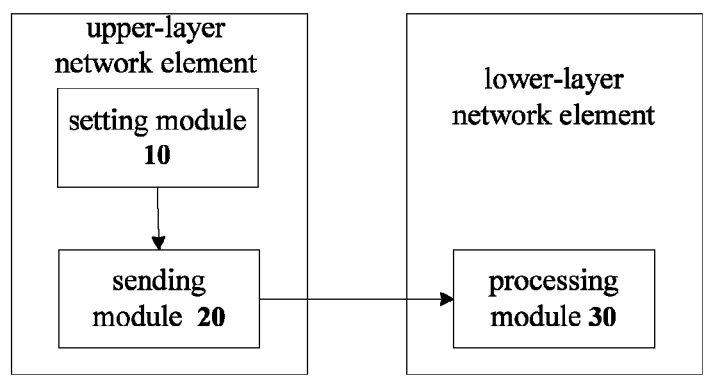
FIG. 5 is a structural block diagram of a synchronization system of control sequence numbers according to the system embodiments of the present invention.

FIG. 5 is a structural block diagram of a synchronization system of control sequence numbers according to the system embodiments of the present invention. The system is used for achieving RLC sequence number synchronization between different network elements. As shown in FIG. 5, this system comprises a processing module 10, a setting module 20 and a sending module 30.

The function of each module will be described in detail hereinafter.

The processing module 10, located in each designated network element of a plurality of designated network elements, is configured to allocate a preset radio link control sequence number to a first radio link control protocol data unit corresponding to a first packet in a data burst and allocate a radio link control sequence number to the subsequent radio link control protocol data units corresponding to packets of this data burst, when each designated network element in a plurality of designated network elements performing radio link control protocol process on the data packets in the data burst received by said each designated network element;

the setting module 20, located in an upper-layer network element of the plurality of designated network elements, is configured to set identification information for a first packet in the data burst, with the identification information indicating that this packet is the first packet; and the sending module 30, located in the upper-layer network element, is configured to send the identification information to the plurality of designated network elements, with this module capable of being connected to the processing module 10 and setting module 20.

In particular, the process of the above setting module 20 setting identification information for the first packet in the data burst includes: setting by the setting module a packet sequence number for the packets in the data burst respectively and taking the packet sequence number corresponding to the first packet in the data burst as identification information and setting it with a fixed value, and making the packet sequence numbers corresponding to other packets in the data burst increased successively from the fixed value according to the sending order.

Furthermore, the process of this setting module 20 setting identification information for the first packet in the data burst includes: setting by the setting module a data burst starting identifier for the first packet in the data burst, wherein the data burst starting identifier is the identification information.

By virtue of the synchronization system of control sequence numbers provided by the embodiments of the present invention, a preset RLC sequence number is allocated to the first protocol data unit generated by the first packet in each data burst, which is able to maintain, after the lower-layer network element restarts, the RLC sequence number synchronization with other lower-layer network elements which do not restart and avoid the radio interference of adjacent cells.

As described above, by virtue of the synchronization method and/or system of control sequence numbers provided by the present invention, a preset RLC sequence number is allocated to the first protocol data unit generated by the first packet in each data burst, which is able to maintain, after the lower-layer network element restarts, the RLC sequence number synchronization with other lower-layer network elements which do not restart, and avoid the radio interference of adjacent cells.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A synchronization method of control sequence numbers for achieving radio link control sequence number synchronization between different network elements, comprising:

allocating a preset radio link control sequence number to a first radio link control protocol data unit corresponding to a first packet in a data burst and allocating a radio link control sequence number to subsequent radio link control protocol data units corresponding to packets of the data burst by each designated network element in a plurality of designated network elements, when the each designated network element in the plurality of the designated network elements performing radio link control protocol process on the packets in the data burst received by said each designated network element in the plurality of the designated network elements;

wherein the plurality of the designated network elements comprise a network element which restarts and maintains the radio link control sequence number synchronization with other designated network elements in the plurality of designated network elements which do not restart.

2. The method according to claim 1, wherein further comprising:

an upper-layer network element of the plurality of designated network elements setting identification information for the first packet in the data burst, with the identification information indicating that this packet is the first packet, and sending the identification information to the plurality of designated network elements.

3. The method according to claim 2, wherein the process of an upper-layer network element of the plurality of designated network elements setting identification information for the first packet in the data burst comprises:

the upper-layer network element of the designated network elements setting a packet sequence number for the packets in the data burst respectively, taking the packet sequence number corresponding to the first packet in the data burst as the identification information and setting the packet sequence number with a fixed value, and making the packet sequence numbers corresponding to other packets in the data burst increased successively from the fixed value according to a sending order.

4. The method according to claim 2, wherein the process of an upper-layer network element of the designated network elements setting identification information for the first packet in the data burst comprises:

the upper-layer network element of the designated network elements setting a data burst starting identifier for the first packet in the data burst, wherein the data burst starting identifier is the identification information.

5. The method according to claim 1, wherein the upper-layer network element of the designated network elements includes one of the followings: a multimedia gateway of long term evolution system, a main control radio network controller of universal terrestrial radio access network, and a master node+of enhanced high speed packet access system; and the designated network elements comprise one of the followings: an Evolved node B of long term evolution system, an slave control radio network controller of universal terrestrial radio access network, and an slave node+of enhanced high speed packet access system.

6. The method according to claim 1, wherein the data burst is a set of data packets which are marked with a same timestamp information; or the data burst is a set of data packets which perform radio link control concatenation process; or the data burst is one data packet.

7. The method according to claim 1, wherein the allocated radio link control sequence number is added by one successively.

8. The method according to claim 2, wherein the upper-layer network element of the designated network elements includes one of the followings: a multimedia gateway of long term evolution system, a main control radio network controller of universal terrestrial radio access network, and a master node+of enhanced high speed packet access system; and the designated network elements comprise one of the followings: an Evolved node B of long term evolution system, an slave control radio network controller of universal terrestrial radio access network, and an slave node+of enhanced high speed packet access system.

9. The method according to claim 3, wherein the upper-layer network element of the designated network elements includes one of the followings: a multimedia gateway of long term evolution system, a main control radio network controller of universal terrestrial radio access network, and a master node+of enhanced high speed packet access system; and the designated network elements comprise one of the followings: an Evolved node B of long term evolution system, an slave control radio network controller of universal terrestrial radio access network, and an slave node+of enhanced high speed packet access system.

10. The method according to claim 4, wherein the upper-layer network element of the designated network elements includes one of the followings: a multimedia gateway of long term evolution system, a main control radio network controller of universal terrestrial radio access network, and a master node+of enhanced high speed packet access system; and the designated network elements comprise one of the followings: an Evolved node B of long term evolution system, an slave control radio network controller of universal terrestrial radio access network, and an slave node+of enhanced high speed packet access system.

11. The method according to claim 2, wherein the data burst is a set of data packets which are marked with a same timestamp information; or the data burst is a set of data packets which perform radio link control concatenation process; or the data burst is one data packet.

12. The method according to claim 3, wherein the data burst is a set of data packets which are marked with a same timestamp information; or the data burst is a set of data packets which perform radio link control concatenation process; or the data burst is one data packet.

13. The method according to claim 4, wherein the data burst is a set of data packets which are marked with a same timestamp information; or the data burst is a set of data packets which perform radio link control concatenation process; or the data burst is one data packet.

14. The method according to claim 2, wherein the allocated radio link control sequence number is added by one successively.

15. The method according to claim 3, wherein the allocated radio link control sequence number is added by one successively.

16. The method according to claim 4, wherein the allocated radio link control sequence number is added by one successively.

17. A synchronization system of control sequence numbers for achieving radio link control sequence number synchronization between different network elements, comprising:

a processing module, located in each designated network element of a plurality of designated network elements, configured to allocate a preset radio link control sequence number to a first radio link control protocol data unit corresponding to a first packet in a data burst and allocate a radio link control sequence number to subsequent radio link control protocol data units corresponding to packets of the data burst, when said each designated network element in the plurality of designated network elements performing radio link control protocol process on the data packets in the data burst received by said each designated network element in the plurality of the designated network elements;

a setting module, located in an upper-layer network element of the plurality of designated network elements, configured to set identification information for a first packet in the data burst, with the identification information indicating that this is the first packet; and a sending module, located in the upper-layer network element, configured to send the identification information to the plurality of designated network elements;

wherein the plurality of the designated network elements comprise a network element which restarts and maintains the radio link control sequence number synchronization with other designated network elements in the plurality of designated network elements which do not restart.

18. The system according to claim 17, wherein the process of the setting module setting the identification information for the first packet in the data burst comprises:

setting by the setting module a packet sequence number for the packets in the data burst respectively, taking the packet sequence number corresponding to the first packet in the data burst as the identification information and setting this packet sequence number as a fixed value, and making the packet sequence numbers corresponding to other packets in the data burst increased successively from the fixed value according to a sending order.

19. The system according to claim 17, characterized in that the process of the setting module setting the identification information for the first packet in the data burst comprises:

setting by the setting module a data burst starting identifier for the first packet in the data burst, wherein the data burst starting identifier is the identification information.

* * * * *